(12) United States Patent
Craane et al.

(10) Patent No.: US 11,585,142 B2
(45) Date of Patent: Feb. 21, 2023

(54) OPEN ROOF ASSEMBLY FOR USE IN A VEHICLE AND A METHOD FOR OPERATING SAME

(71) Applicant: Inalfa Roof Systems Group B.V., Oostrum (NL)

(72) Inventors: Dennie Wilhelmus Hendrikus Craane, Nijmegen (NL); Gerrit Schwepper, Kamp-Lintfort (DE)

(73) Assignee: INALFA ROOF SYSTEMS GROUP B.V., Oestrum (NL)

( * ) Notice: Subject to any disclaimer, the term of this patent is extended or adjusted under 35 U.S.C. 154(b) by 136 days.

(21) Appl. No.: 17/115,415

(22) Filed: Dec. 8, 2020

(65) Prior Publication Data

US 2021/0172233 A1    Jun. 10, 2021

(30) Foreign Application Priority Data

Dec. 10, 2019   (EP) ..................................... 19214698

(51) Int. Cl.
*E05F 15/40*   (2015.01)
*E05F 15/659*   (2015.01)
(Continued)

(52) U.S. Cl.
CPC .............. *E05F 15/40* (2015.01); *B60J 7/0573* (2013.01); *E05F 15/659* (2015.01);
(Continued)

(58) Field of Classification Search
CPC ....... E05F 15/40; E05F 15/659; B60J 7/0573; H02H 7/0851; E05Y 2900/542; H02P 3/22; H02P 7/04
(Continued)

(56) References Cited

U.S. PATENT DOCUMENTS 6,198,241 B1 * 3/2001 Calamatas ........... H02H 7/0838
                                                          361/33
7,038,410 B2 * 5/2006 Delaporte ............. E05F 15/632
                                                         318/268
(Continued)

FOREIGN PATENT DOCUMENTS

| GB | 2026723 A | 2/1980 |
|----|-----------|--------|
| JP | 2010110084 A | 5/2010 |
| JP | 2019015141 A | 1/2019 |

OTHER PUBLICATIONS

European Search Report for European Patent Application No. 19214698.3, dated Jun. 19, 2020.

*Primary Examiner* — David Luo
(74) *Attorney, Agent, or Firm* — Steven M. Koehler; Westman, Champlin & Koehler, P.A.

(57) ABSTRACT

An open roof assembly for use in a vehicle roof of a vehicle comprises a moveably arranged closure member for selectively covering or at least partially exposing an opening in the vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor. The electric driving unit comprises four switching devices in a bridged configuration and the control unit is configured to control a motion of the closure member by controlling operation of the switching devices, and to incur a safety stop during a motion of the closure member by an immediate reversal of a polarity of the supply signal.

12 Claims, 5 Drawing Sheets

(51) Int. Cl.
*B60J 7/057* (2006.01)
*H02H 7/085* (2006.01)
*H02P 3/22* (2006.01)

(52) U.S. Cl.
CPC ...... *H02H 7/0851* (2013.01); *E05Y 2900/542* (2013.01); *H02P 3/22* (2013.01)

(58) Field of Classification Search
USPC .............................. 318/469, 468, 466, 445
See application file for complete search history.

(56) References Cited

U.S. PATENT DOCUMENTS 7,453,222 B2 * 11/2008 Kanai .................. H02P 6/16
318/432
7,741,794 B2 * 6/2010 Nishibe .................. H02P 7/04
318/400.29

* cited by examiner

OPEN ROOF ASSEMBLY FOR USE IN A VEHICLE AND A METHOD FOR OPERATING SAME

BACKGROUND

The discussion below is merely provided for general background information and is not intended to be used as an aid in determining the scope of the claimed subject matter.

The invention relates to an open roof assembly for use in a vehicle roof of a vehicle.

An open roof assembly for use in a vehicle roof of a vehicle is known. In particular, in a known open roof assembly, a moveably arranged closure member is provided for selectively covering an opening in the vehicle roof or at least partially exposing such opening. An electric motor may be provided and be operatively coupled to the closure member through a mechanical drive assembly for moving the closure member between a closed position, in which the opening is covered, and an open position, in which the opening is at least partly exposed. Further, an electric driving unit for providing a supply signal to the electric motor and a control unit operatively coupled to the electric driving unit may be provided for controlling operation of the electric motor and thereby a position and motion of the closure member.

Under normal operating conditions, the control unit is configured to control the electric motor and thus the closure member. The control unit is configured to switch the electric motor on or off depending on e.g. user commands. The electric motor is operatively coupled to the closure member through the mechanical drive assembly such that the closure member moves, when the electric motor is switched on.

The mechanical drive assembly, however, usually has some play due to which a motion of the closure member may slightly lag as compared to the operation of the electric motor. In normal operating conditions, this lag is not a problem. Under exceptional circumstances, in particular when an object may be pinched between a moving closure member and an edge of the opening, the play in the mechanical drive assembly enables the closure member to move further due to e.g. inertia, even when the electric motor has been switched off and has stopped. Such an overshoot may lead to an increased force exerted by the closure member on the object. It is of course desirable to reduce such force.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

It is an object of the present invention to provide for a reliable, simple and cost-effective open roof assembly with a reduced overshoot in case of a safety stop and a corresponding method of operation.

In a first aspect, the object is achieved in an open roof assembly for use in a vehicle roof of a vehicle according to claim 1. The open roof assembly comprises a moveably arranged closure member for selectively covering or at least partially exposing an opening in the vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor, wherein the electric driving unit comprises four switching devices in a bridged configuration and wherein the control unit is configured to control a motion of the closure member by controlling operation of the switching devices, and incur a safety stop during a motion of the closure member by an immediate reversal of a polarity of the supply signal.

Using a bridged configuration of at least four switching devices in the electric driving unit provides for more electric driving modes as compared to two switching devices which usually only provide for two electric driving modes, i.e. forward and rearward. To stop the electric motor, both switching devices are switched off, which enables the electric motor to rotate with a motion of the closure member due to inertia. The bridged configuration of four switching devices further provides for a braking mode, in which supply terminals of the electric motor are short-circuited. The short-circuit over the supply terminals effectively brakes a rotation of the electric motor, as well known in the art. Such active braking is known to be used for a safety stop. However, the active braking mode does not address the problem of overshoot due to play in the mechanical drive assembly. Therefore, in the open roof assembly according to the present invention, the electric driving assembly is controlled by the control unit such that, for a safety stop, the electric motor is immediately switched in a reverse direction.

While the above-mentioned prior art safety stops allow the closure member to gradually reduce speed based on mechanical resistance in the electric motor and the mechanical drive assembly, thereby absorbing the play in the mechanical drive assembly, the safety stop according to the present invention absorbs the play by reversal of the electric motor. Thus, the overshoot of the closure member is effectively reduced.

In an embodiment, the reversal of the polarity is maintained for at least a first period of reversal, wherein the first period of reversal is selected based on an amount of play in the mechanical drive assembly such that in the first period of reversal the play in the mechanical drive assembly is absorbed at least partially by reversal of the electric motor and the motion of the closure member is stopped. In the first period of reversal the closure member is effectively stopped as soon as possible for effectively reducing a safety stop overshoot, i.e. the amount of travel after a trigger that a safety stop is needed. For example, the first period of reversal may be configured to a period needed for the closure member to reach a speed in the original direction of motion, i.e. the direction in which the closure member was moving at the time of the trigger for a safety stop, equal to zero. Due to inertia of the electric motor and other parts, the closure member may then even move in the reverse direction after the electric motor has been switched off.

In a further embodiment, the control unit may be configured to continue the first period of reversal with a second period of reversal. In such embodiment, the motion of the closure member is stopped during the first period of reversal and, during the second period of reversal, the closure member is controlled to move in a reverse direction, for example, to release a pinched or trapped object. Only in the second period of reversal, the closure member actually moves in the reverse direction, while in the first period of reversal, a speed of the closure member is reduced and eventually stopped. It is noted that, as used herein, the reverse direction refers to a direction reverse to a direction of movement of the closure member prior to the safety stop.

The second period of reversal may be selected suitably by a person skilled in the art. For example, the second period of reversal may be relatively short just to move the closure member only over a minor distance to release a trapped object. In another example, the second period of reversal may be selected such that the closure member moves to a predetermined position, e.g. a fully open position or a specific partially open position. The present invention is not limited to any particular duration or selection of the second period of reversal.

In an embodiment, the switching devices are solid state switching devices, in particular transistors and more in particular MOSFET transistors. The bridged electric drive assembly may comprise relays, but preferably the switching devices are solid state devices having short switching times such to reduce the safety stop overshoot further.

Moreover, in a particular embodiment, the control unit is configured to control the motion of the closure member by application of a pulse width modulation (PWM) control method. Using solid state switching devices, like FET transistors, the control unit may perform pulse width modulation control, which as such is well known in the art, thereby enabling to regulate a speed of the electric motor, for example. Using such PWM control and regulating the speed of the electric motor, the control unit may be configured to determine an actual position of the closure member and to apply a closed-loop control method using the determined actual position of the closure member. In the closed-loop control, the speed of the electric motor may be adapted and controlled based on the determined actual position. For example, the determined actual position may be compared to an expected position and the supply signal to the electric motor may be adapted in response to any deviation between expected and actual position. Further, for a predetermined stop, the speed of the electric motor may be reduced even prior to arriving at the desired position such to enable an accurate positioning of the closure member at the desired position. Such a closed-loop control is as such known from the prior art and is believed to be apparent to those skilled in the art. Therefore, the closed-loop control method is not further elucidated herein.

In an embodiment, the control unit is configured to incur a predetermined stop of the motion of the closure member by short-circuiting the electric motor. A predetermined stop, as used herein, refers to an intended stop position, which is a priori known to the control unit during a motion of the closure member. Hence, the control unit may be configured to take into account an amount of overshoot and stop the electric motor in time such that the closure member, after overshoot, arrives at the intended position, wherein a certain amount of inaccuracy in the positioning may be deemed acceptable. Hence, the control unit may be configured to apply a different stop procedure, when stopping at a predetermined, intended position as compared to when stopping for safety reasons at an unexpected position and at an unexpected time.

It is noted that such a control unit configured for different stopping procedures depending on the kind of stop required may also be suitably and advantageously employed with other kinds of electric drive assemblies and is not particularly limited to the open roof assembly according to the present invention. For example, in the present invention, the reversal of the electric motor for absorbing the play in the mechanical drive assembly prevents a gradual speed reduction of the closure member. As a result, a relatively hard stop is enforced. The inertia of the closure member is therefore to be absorbed by the mechanical drive assembly, such as a drive cable and/or a gearwheel. The resulting high forces may, depending on a number of parameters, be so high that a part of the mechanical drive assembly is damaged. For example, the drive cable may be stretched. Therefore, this method of stopping may not be preferred unless it is needed in view of safety. In such case, another method of stopping may be applied in case of an expected stop.

In an embodiment, the control unit is configured to detect an obstruction in a travel path of the closure member in motion and incurring the safety stop upon detection of such obstruction. While a separate sensor system may be provided to detect an obstruction, e.g. by an object, the control unit may be configured to detect such an obstruction. For example, based on an input from common Hall sensors operatively coupled to the electric motor and an electric current consumed by the electric motor, the control unit may be configured to detect changed conditions and determine that a foreign object has been pinched. Moreover, based on similar considerations and possibly one or more additional mathematical models, the control unit may be configured to derive the position of the closure member without a specific or dedicated position sensor. So, in the above-mentioned embodiment with closed-loop control, the control unit may be configured to derive the actual position without application of a dedicated sensor.

In an aspect, the present invention further provides a method of operating an open roof assembly. The open roof assembly comprises a moveably arranged closure member for selectively covering or at least partially exposing an opening in the vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor. The electric driving unit comprises four switching devices in a bridged configuration. The method comprises the control unit performing the steps of controlling a motion of the closure member by controlling operation of the switching devices, and incurring a safety stop during a motion of the closure member by an immediate reversal of a polarity of the supply signal.

In an embodiment of the method, the step of reversal of the polarity is maintained for at least a first period of reversal, wherein the first period of reversal is selected based on an amount of play in the mechanical drive assembly such that in the first period of reversal the play in the mechanical drive assembly is absorbed at least partially by reversal of the electric motor and the motion of the closure member is stopped.

In a further aspect, the present invention provides a computer software product comprising computer readable and executable instructions for instructing a computer processor to perform the method steps according to the present invention. In particular, such computer processor may be comprised in a control unit of an open roof assembly.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art

DETAILED DESCRIPTION OF THE ILLUSTRATIVE EMBODIMENTS

Figure 1A:
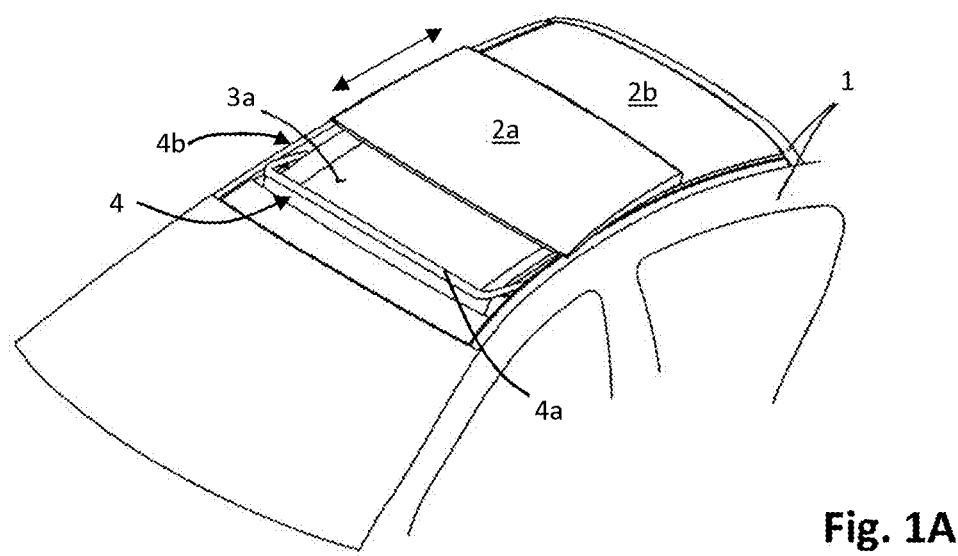
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
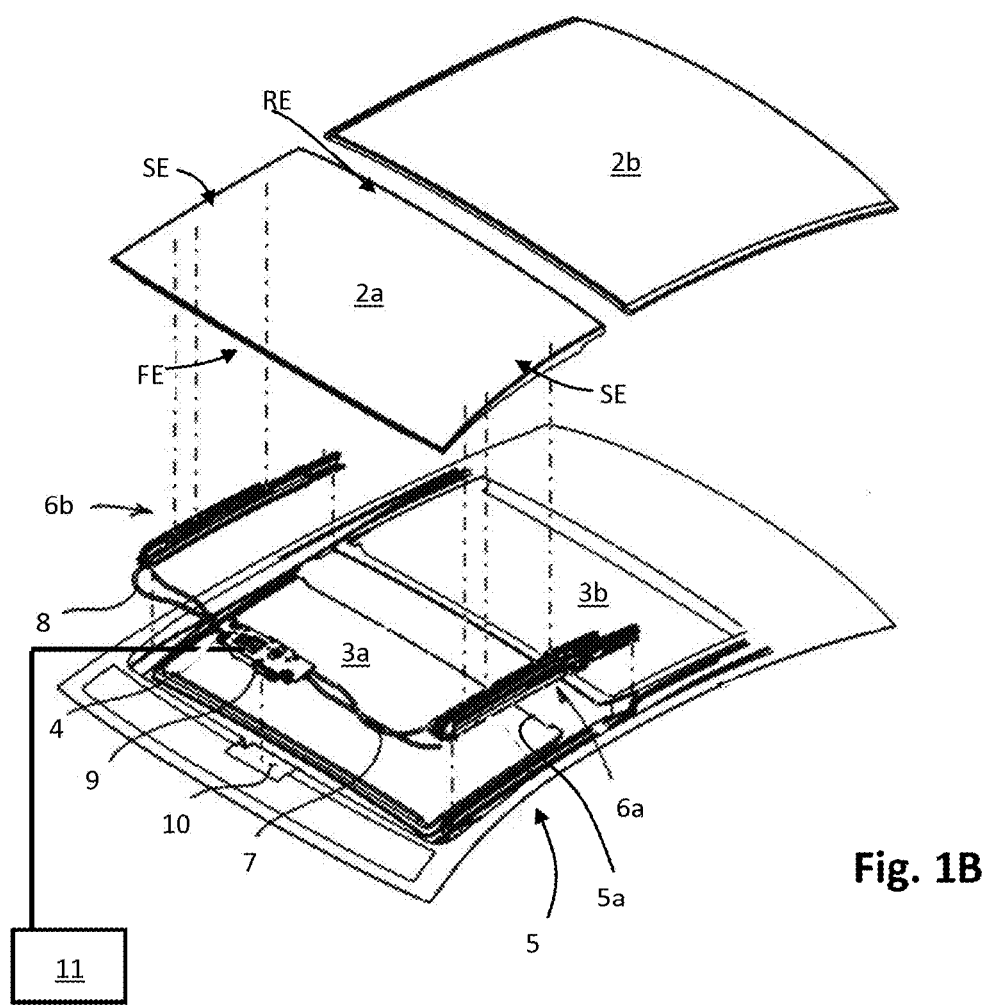
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2*a* under the fixed panel 2*b* or any other structure or element provided behind the rear end (RE) of the moveable panel 2*a*. In further exemplary embodiments, the moveable panel 2*a* may be merely moveable between a closed position and a tilted position or between a closed position and an open position.

In the illustrated embodiment, the electric motor 9 is mounted near or below the front end (FE) of the moveable panel 2*a* at a recess 10. In another embodiment, the electric motor 9 may be positioned at any other suitable position or location. For example, the electric motor 9 may be arranged near or below the rear end (RE) of the moveable panel 2*a* or below the fixed panel 2*b*.

A control unit 11 is schematically illustrated and is operatively coupled to the electric motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the electric motor 9 and thus the moveable roof assembly.

Figure 2:
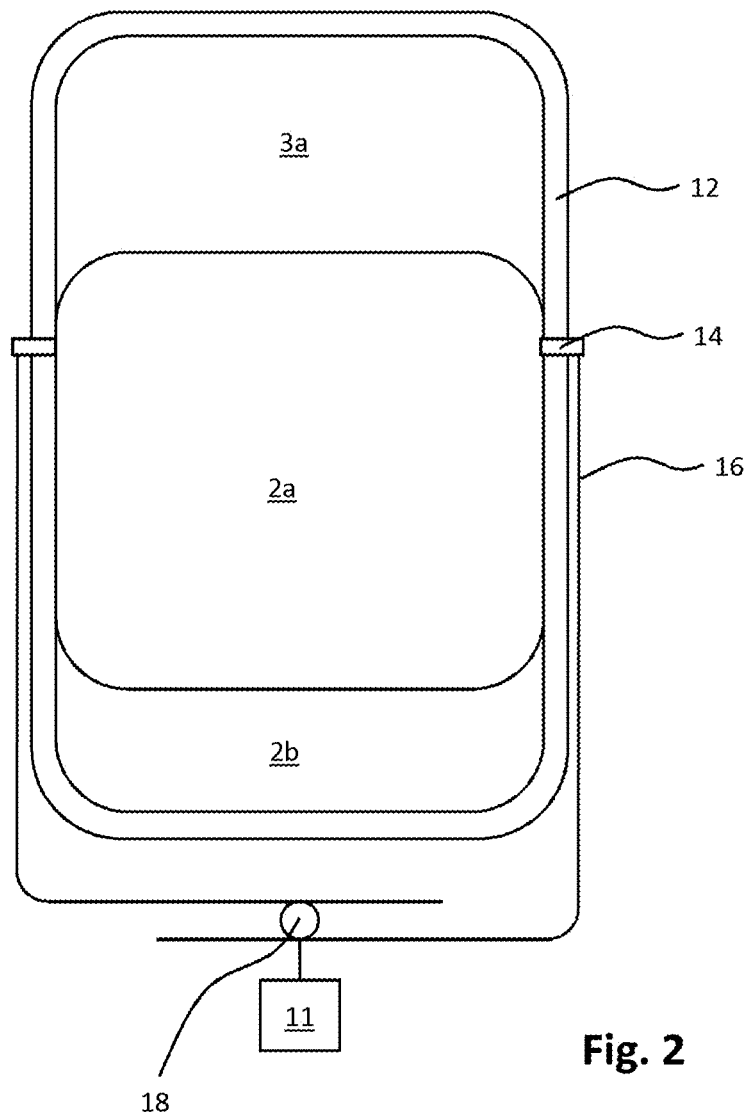
FIG. 2 shows a top view of an embodiment of an open roof assembly with a moveable closing member and a corresponding drive assembly.

FIG. 2 schematically illustrates an open roof assembly with a mechanical drive assembly. The open roof assembly comprises the moveable closure member 2*a* for closing the first roof opening 3*a*, the fixed panel 2*b* and a support frame 12. The support frame 12 is arranged and configured to mount and support the open roof assembly on a body frame of a vehicle. In FIG. 2, the moveable closure member 2*a* is schematically coupled to a drive cable 16 through a coupling element 14. In practice and as illustrated in FIGS. 1A and 1B, the moveable closure member 2*a* is arranged on the support frame 12 through the guide assemblies 6*a*, 6*b* and each guide assembly 6*a*, 6*b* is operated through an associated drive cable 16. In the illustrated embodiment, the drive cable 16 is moveable by the electric motor through an operative, mechanical coupling to a suitable gear wheel 18. The drive cable 16 and the gear wheel 18 are comprised in the mechanical drive assembly that operatively couples the electric motor 9 and the closure member 2*a*.

The gear wheel 18 is mechanically coupled to the electric motor 9, which is operatively coupled to the control unit 11. The control unit 11 may comprise electronic control circuitry, possibly comprising a computer processor. Further, the control unit 11 may be operatively coupled to one or more sensors. For example, a Hall sensor and usually two Hall sensors are arranged next to the electric motor 9 such that an alternating signal from the Hall sensors is received by the control unit 11 based on which the control unit 11 is enabled to derive a speed of the electric motor and an amount of displacement of the closure member. Other sensors may be provided and coupled to the control unit 11 as well.

Especially when closing the closure member 2*a*, but also when opening, an object may be pinched and become trapped between a leading edge of the closure member 2*a* and the support frame 12. To prevent damage to either of the object and the open roof assembly, the open roof assembly may be provided with means to detect such a pinch and possible entrapment, wherein such means may comprise dedicated sensors and model-based methods, e.g. embedded in software. Such methods and devices are known in the art and are not further elucidated herein, thereby noting that the present invention is not limited to any particular method or device for such pinch and entrapment detection. In accordance with the present invention, upon a pinch or entrapment detection, a safety stop is incurred, which may deviate from a normal stop.

Figure 3A:
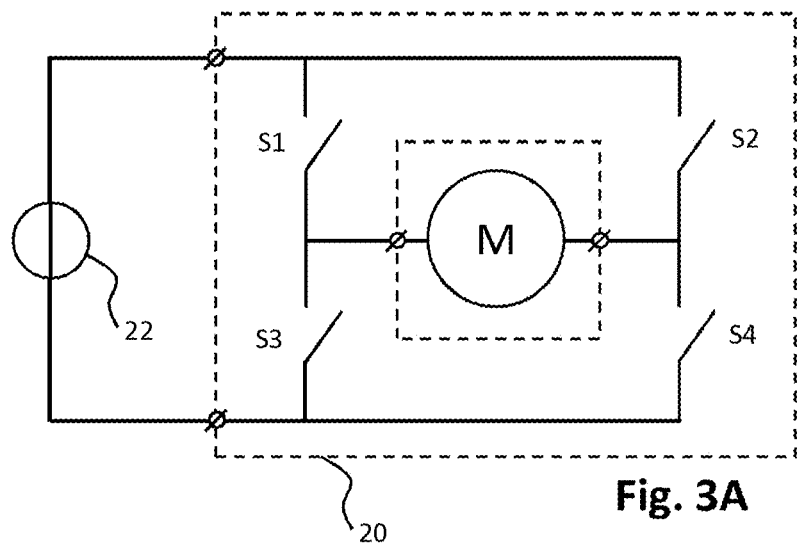
FIG. 3A shows a diagram of an electric driving unit as used in the present invention.

FIG. 3A illustrates a bridged configuration of four switching devices S1, S2, S3 and S4 comprised in an electric driving unit 20. A voltage source 22 is coupled to supply terminals of the electric driving unit 20 and an electric motor M is coupled to output terminals of the electric driving unit 20. The four switching devices S1-S4 are operatively coupled to the control unit 11 such that the control unit 11 is enabled to switch the switching devices S1-S4 between an on (conducting) state and an off (non-conducting) state.

As well known, the switching devices S1-S4 may be any kind of switching device, but in a practical embodiment the switching devices S1-S4 are MOSFET transistors with a parallel intrinsic diode. Such embodiment is well known and is not further elucidated herein.

Further, as known in the art, by suitably controlling the four switch devices S1-S4, the electric motor M may be driven in a number of modes. In a forward mode, only the switching devices S1 and S4 are in an on-state and an electric current flows through the electric motor M driving the electric motor M in a forward direction. In rearward mode, only the switching devices S2 and S3 are switched in the on-state such that a current flows in an opposite direction through the electric motor M driving the electric motor M in the rearward direction. In an active braking mode, either only the switching devices S1 and S2 are switched on or only the switching devices S3 and S4 are switched on, thereby short-circuiting the electric motor M, which effectively brakes the electric motor M.

Further, a regenerative braking mode is known. When the electric motor M is operated in the forward mode or rearward mode and the switching devices are all switched non-conducting, the electric motor M acting moves on due to inter alia inertia and starts to act as a dynamo, generating a current that charges the voltage source 20. It is noted that the current may then be forced through the intrinsic diodes such that the transistors will dissipate a relatively large amount of energy and generate a lot of heat. To prevent the heat generation, the switching devices may be switched such that the electric motor is switched from the forward direction to the rearward direction, for example, thereby switching the transistors carrying the generated current conductive, thereby reducing the energy dissipation in those transistors and thus less heat is generated in the transistors.

As mentioned, the regenerative braking mode is known for stopping an electric motor M, while charging the voltage source 20. In the present invention, the regenerative braking mode is employed to stop the closure member 2*a*. Due to play in the mechanical driving assembly, when the electric motor M is stopped, the closure member 2*a* is still able to move due to inertia. Therefore, the regenerative braking mode is maintained preferably until the closure member 2*a* is stopped, which effectively means that the electric motor M is stopped and reversed, thereby absorbing at least a part of the play in the mechanical driving assembly, thereby reducing the overshoot of the closure member 2*a*. This is illustrated in more detail in and described in relation to FIGS. 4A-4C.

Figure 3B:
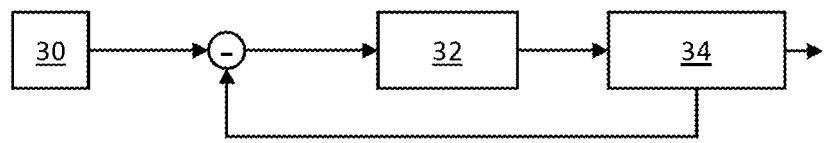
FIG. 3B shows a diagram of an embodiment of a control unit applying a closed-loop control method.

FIG. 3B shows a simple diagram of a closed-loop control system that may be used in combination with the electric driving unit 20 of FIG. 3A. In the illustrated closed-loop control system, a set position 30 is provided as a starting point. A proportional controller 32, e.g. a PID controller, uses a deviation of an actual position from the set position as an input and determines a setting for the electric motor. The setting for the electric motor is output to a motor control unit 34, which drives the electric motor by driving the switching devices S1-S4 (FIG. 3A). By high frequency switching of at least one of the switching devices, e.g. in forward mode switching device S1 or in rearward mode switching device S2, with a suitable duty cycle (pulse width), a speed of the electric motor may be controlled. Such a pulse width modulation (PWM) method is generally known and is not further elucidated herein.

The motor control unit 34, in the illustrated embodiment, is further configured to determine based on suitable motor parameters and sensor signals, such as an electric current flowing through the electric motor and/or a Hall sensor signal as hereinabove described, to determine the actual position of the closure member 2a. This actual position is fed back to determine the deviation between the actual position and the set position 30, based on which the proportional controller may adapt the setting for the electric motor. Of course, in another embodiment, a direct (or other indirect) position sensor may be used instead.

Figure 4A:
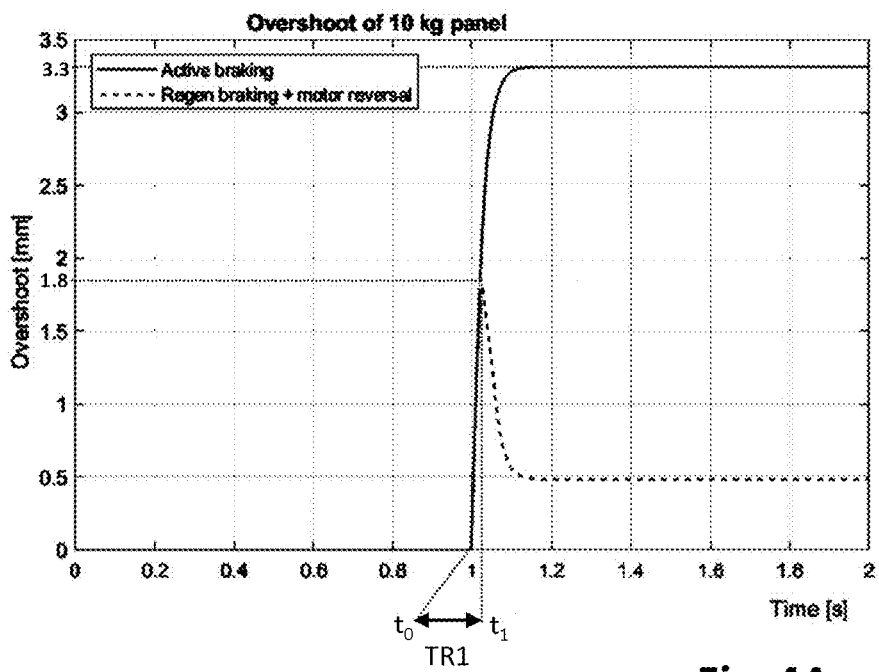
FIG. 4A shows a graph illustrating an overshoot of a closure member.
Figure 4B:
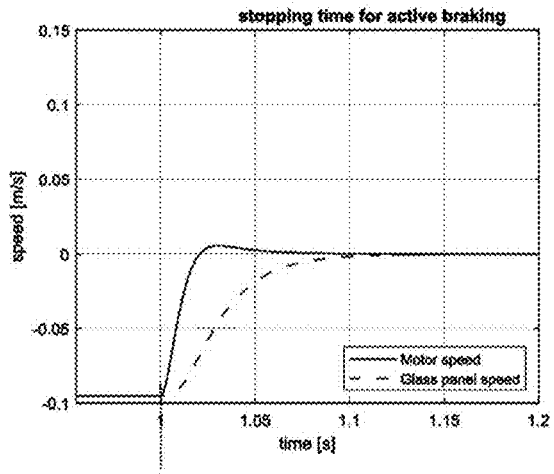
FIG. 4B shows a graph illustrating a motor speed and a closure member speed according to a prior art embodiment.
Figure 4C:
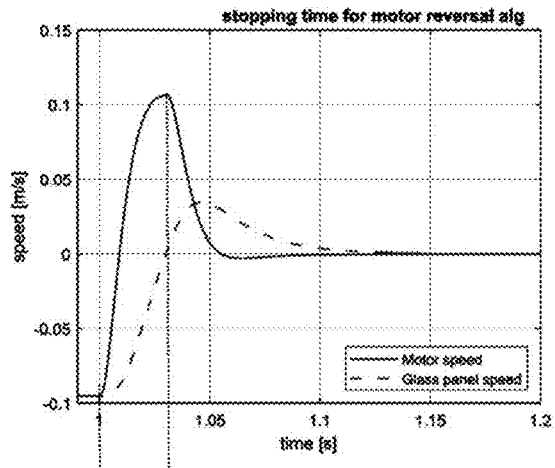
FIG. 4C shows a graph illustrating a motor speed and a closure member speed according to an embodiment according to the present invention.

FIGS. 4A-4C are the results of a simulation based on a model comprising a representative electric motor, a representative mechanical driving assembly and a closure member, wherein the closure member 2a has a mass of 10 kg.

FIG. 4A shows a graph of the overshoot of the closure member 2a. The horizontal axis represents time in seconds and the vertical axis represents the amount of overshoot in millimetre, wherein the overshoot is defined as the distance travelled after the safety stop is initiated. In the illustrated simulated example, the safety stop is initiated at a time to (at 1 on the horizontal axis). So, any motion of the closure member 2a in the original direction of motion after to is considered overshoot.

Two methods of braking are illustrated. A solid line represents the overshoot when applying the prior art active braking by short-circuiting, which is hereinabove referred to as the active braking mode. A dashed line represents the braking method according to the present invention, wherein the regenerative braking mode is started and maintained until the closure member 2a is actually stopped.

The active braking mode as illustrated by the solid line is started at time to and the overshoot increases gradually to about 3.3 millimetre after about 120 milliseconds. Then, the closure member 2a is stopped and the overshoot remains constant. The regenerative braking mode (dashed line) starts at the same time to and the overshoot increases gradually apparently similar to the active braking mode until time $t^1$ at an overshoot of about 1.8 millimetre. At time $t^1$, the overshoot starts to reduce to arrive at a value of about 0.5 millimetre after about 120 milliseconds. So, whereas the active braking mode results in an overshoot of about 3.3 millimetre, the safety stop according to the present invention results in a maximum overshoot of about 1.8 millimetre, reducing the overshoot with about 1.5 millimetre. This is a significant reduction.

FIGS. 4B and 4C illustrate in more detail the motion of the closure member 2a in relation to the motion of the electric motor. In both graphs, the horizontal axis represents the time in seconds and the vertical axis represents a speed in meters per second. Further, in both graphs, a solid line shows a motor speed and a dashed line shows a closure member (glass panel) speed. The results of FIGS. 4B and 4C correspond to the result of FIG. 4A.

FIG. 4B illustrates the results for the active braking mode as a safety stop method. At time to, the safety stop is initiated and after a short period for switching the switching devices, which in case MOSFET's are used may be as short as 0.4 milliseconds, the motor speed reduces from almost 0.1 m/s (in the graph indicated as a reverse direction: −0.1 m/s) to about 0 m/s. The closure member speed however reduces significantly slower. Whereas the motor speed has reduced to zero after about 20 milliseconds, it takes the closure member about 120 milliseconds to arrive at a speed of about 0 m/s. In the period in which the motor speed is about 0 m/s, the closure member is able to maintain its motion due to the play in the mechanical driving assembly albeit that the closure member speed reduces gradually.

In FIG. 4C, the safety stop method according to the present invention is illustrated. At time to, the regenerative braking mode is started after the above-mentioned short period for switching. As compared to the active braking mode of FIG. 4B, the motor speed reduces more rapidly from −0.1 m/s through 0 m/s at about 10 milliseconds to about 0.1 m/s at time $t^1$ at about 30 milliseconds. Correspondingly, the closure member speed reduces more rapidly. At time $t_1$, i.e. after about 30 milliseconds, the closure member speed is reduced to 0 m/s.

From the moment that the motor speed changes direction (at 0 m/s), the electric motor starts moving in the reverse direction, thereby starting to absorb at least a part of the play in the mechanical driving assembly.

At the moment that the closure member speed is reduced to 0 m/s, the motor speed is about 0.1 m/s and the electric motor may be switched off. Still, the electric motor moves further in the reverse direction before stopping. In the time period that the electric motor is stopping, the closure member is moved in the reverse direction to eventually come to a halt after about 120 milliseconds.

Figure 5:
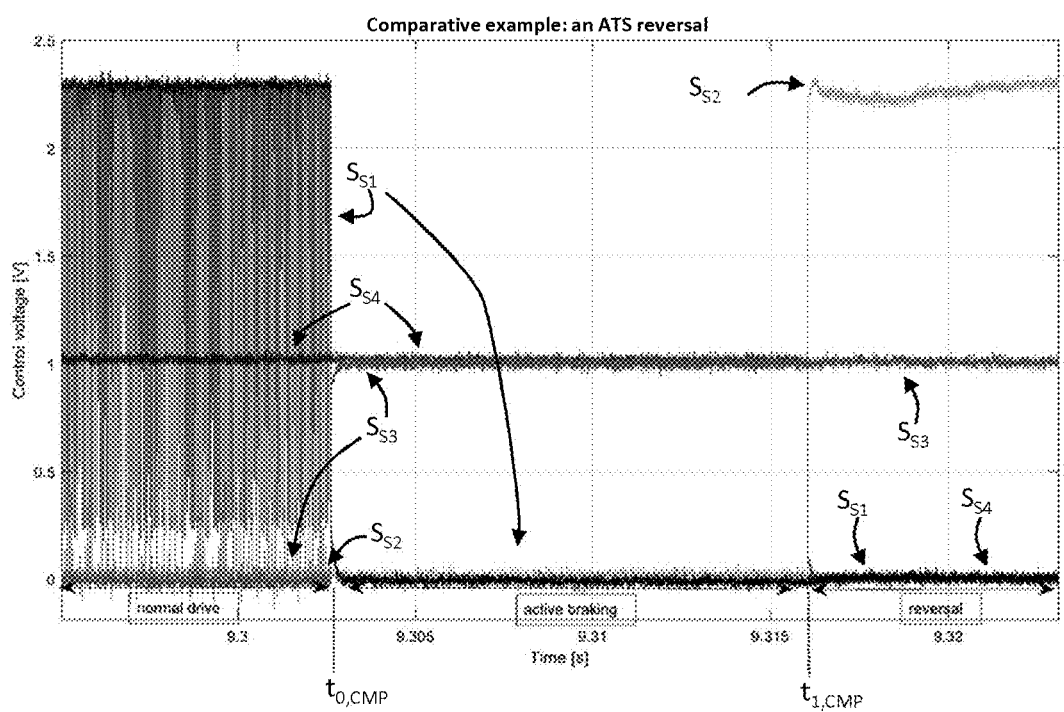
FIG. 5 shows a graph illustrating control signals of a comparative example according to the prior art.

FIG. 5 illustrates four actual control signals $S_{S1}$, $S_{S2}$, $S_{S3}$ and $S_{S4}$ driving four switching devices (cf. FIG. 3A) as measured on a commercially available open roof assembly. FIG. 5 thus illustrates a safety stop method as employed in the commercially available open roof assembly as a comparative example.

With reference to both FIG. 3A and FIG. 5, a first control signal $S_{S1}$ controls the first switching device S1, a second control signal $S_{S2}$ controls the second switching device S2, a third control signal $S_{S3}$ controls the third switching device S3 and a fourth control signal $S_{S4}$ controls the fourth switching device S4.

In FIG. 5, the horizontal axis represents time in seconds and the vertical axis represents a voltage in Volt. At about 0 V, the control signals are low and the corresponding switching device is switched off, i.e. is in a non-conducting state. In the illustrated embodiment, at a higher level such as 1 V or higher, the signal is high and the corresponding switching device is switched on, i.e. is in a conducting state.

In the graph of FIG. 5, three stages are noticeable and indicated. In a first stage, the electric motor is driven in a normal drive mode, i.e. the forward mode or the rearward mode.

In a second stage, the electric motor is driven in the active braking mode. In a third stage, the electric motor is driven in the regenerative braking mode (indicated by 'reversal'). In the first stage, the first switching device S1 is driven with a high frequency control signal $S_{S1}$, thereby switching between the on-state and the off-state. The fourth switching device S4 is switched in the conducting on-state as apparent from the high state of the fourth control signal $S_{S4}$. The second and third control signals $S_{S2}$, $S_{S3}$ are both low at about 0 V, indicating that the second and the third switching devices S2, S3 are in the non-conducting off-state. Thus, the electric motor is driven in the forward mode using pulse width modulation to control the speed of the electric motor.

At time $t_{0,CMP}$, the safety stop is initiated. The safety stop starts with an activation of the active braking mode. The first switching device S1 is switched non-conducting, illustrated by the first control signal $S_{S1}$ falling to a low value of about 0 V, while the third control signal $S_{S3}$ is raised to a high value of about 1 V, thereby switching the third switching device S3 conducting and short-circuiting the electric motor.

After a period of about 13 milliseconds, i.e. at time $t_{1,CMP}$, the active braking mode is terminated and the third stage is started. The second switching device (second control signal $S_{S2}$ is high) is switched on and the third switching device (third control signal $S_{S3}$ is high) is switched on. Thus, the rearward mode is initiated. If the electric motor is still moving in the original forward direction (first stage) at the start of the third stage, the third stage starts with the regenerative braking mode. In any case, as soon as the electric motor has stopped, the rearward mode drives the electric motor in the rearward direction to initiate a motion of the closure member in the reverse direction. Based on the simulation as illustrated in FIG. 4B and the behaviour and timing of the motor speed, it may be assumed that, in FIG. 5, the timing of the second stage and the timing of the start of the third stage ($t_{1,CMP}$) are intended to substantially stop the electric motor in the second stage prior to starting reversal in the third stage. The third stage is thus not about stopping the closure member, but about reversing the closure member to release a trapped object, if any.

Practical tests have shown that the prior art method of the comparative example indeed has a larger overshoot than the method according to the present invention. In particular, in the practical embodiment, the overshoot using the active braking mode amounted to about 2.2 millimetre, while the method according to the present invention using the regenerative braking mode resulted in an overshoot of about 1.1 millimetre.

It is noted that the effect of the present invention may be different for the original direction of motion. The play in the mechanical driving assembly and in particular the drive cable may be different depending on whether the mechanical driving assembly is used to push the closure member or is used to pull the closure member. However, in both cases, the present invention provides for a reduced overshoot.

Figure 6A:
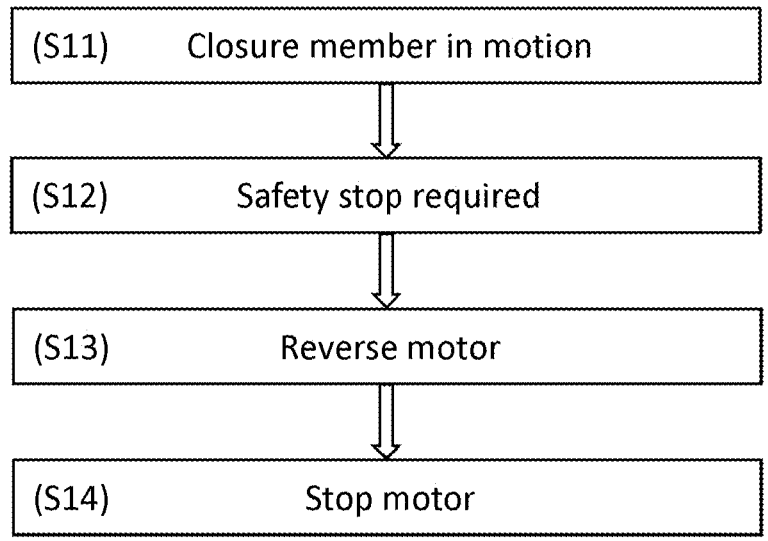
FIG. 6A shows a diagram of a first embodiment of a method according to the present invention.

FIG. 6A illustrates the method according to the present invention. The method starts with a first step S11, in which the closure member is moving in a normal mode, i.e. the forward mode or the rearward mode. Then, in the second step, it is determined that a safety stop needs to be initiated. In response and in accordance with the present invention, the control unit changes the driving mode of the electric motor from the original mode to the reversed mode, which starts as a regenerative braking mode and automatically changes to reverse driving mode such that the electric motor is enabled to absorb at least a part of the play in the mechanical driving assembly. Not earlier than that the closure member has actually stopped moving in the original direction of the first step S11, the electric motor is stopped in a fourth step S14.

Figure 6B:
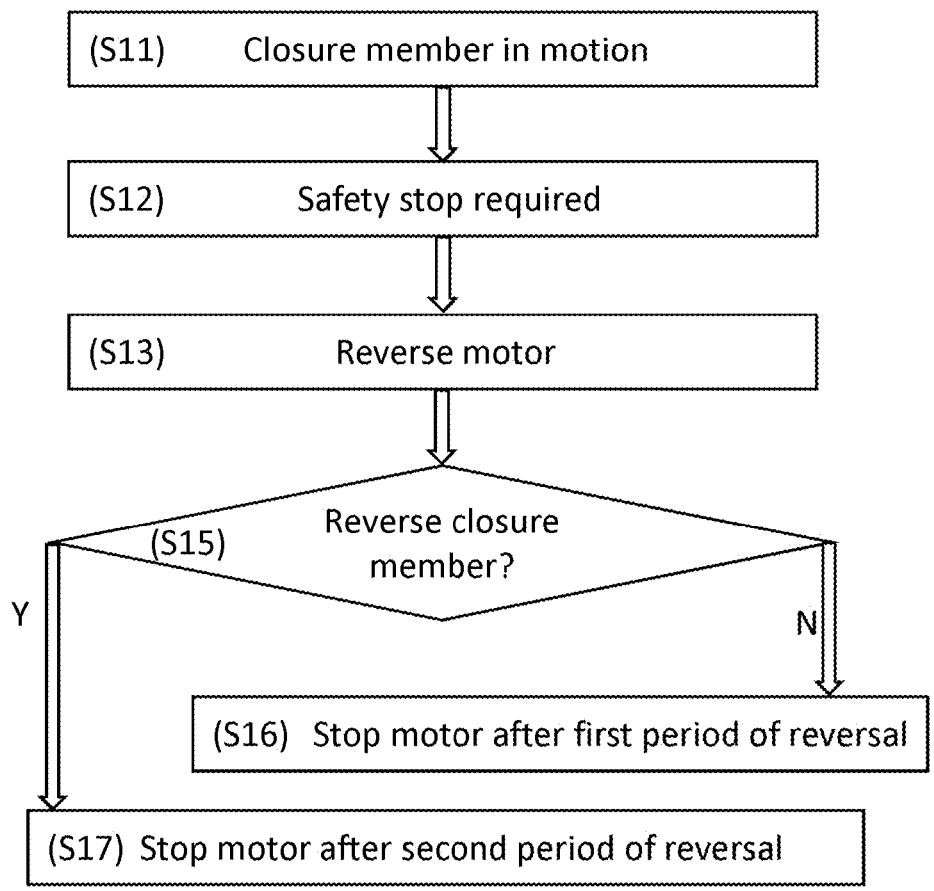
FIG. 6B shows a diagram of a second embodiment of a method according to the present invention.

FIG. 6B illustrates a particular embodiment, wherein the first, second and third steps S11, S12, S13 are the same as in the embodiment of FIG. 6A. In this embodiment, a next step, i.e. fifth step S15, comprises deciding whether the closure member needs to be reversed after stopping. If it is decided that the closure member does not need to be reversed, in a sixth step S16, the electric motor is stopped after a first period of reversal. The first period of reversal corresponds to the period need to stop the closure member and is indicated in FIG. 4A as the first period of reversal TR1. This period may be a predetermined period of time or may be in situ determined based on the closure member motion or closure member speed. It is noted that after the first period of reversal TR1, the closure member may move in the reverse direction due to inertia as illustrated in FIG. 4C. Due to such reverse movement, it may not be needed to actively reverse the closure member.

If, in the fifth step S15, it is however determined that the closure member needs to be moved in the reverse direction, the seventh step S17 is started, wherein the first period of reversal TR1 is followed by a second period of reversal such that the closure member is actively moved in the reverse direction. Such reverse movement may be just a short movement to ensure that a possibly trapped object is released after which the closure member may be stopped or the closure member may be moved even further in the reverse direction.

Of course, the embodiment of FIG. 6A may as well be employed wherein the fourth step is executed for a period longer than the first period of reversal such that the closure member is always reversed after a safety stop.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open roof assembly for use in a vehicle roof of a vehicle, the open roof assembly comprising:

a moveably arranged closure member for selectively covering or at least partially exposing an opening in the vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor, wherein the electric driving unit comprises four switching devices in a bridged configuration and wherein the control unit is configured to:

control a motion of the closure member by controlling operation of the switching devices, and incur a safety stop during a motion of the closure member by an immediate reversal of a polarity of the supply signal.

2. The open roof assembly according to claim 1, wherein the reversal of the polarity is maintained for at least a first period of reversal, wherein the first period of reversal is selected based on an amount of play in the mechanical drive assembly such that in the first period of reversal the play in the mechanical drive assembly is absorbed at least partially by reversal of the electric motor and the motion of the closure member is stopped.

3. The open roof assembly according to claim 2, wherein the control unit is configured to continue the first period of reversal with a second period of reversal, wherein the motion of the closure member is stopped during the first period of reversal and wherein during the second period of reversal the closure member is controlled to move in a reverse direction.

4. The open roof assembly according to claim 1, wherein the switching devices are solid state switching devices.

5. The open roof assembly according to claim 4, wherein the control unit is configured to control the motion of the closure member by application of a pulse width modulation (PWM) control method.

6. The open roof assembly according to claim 5, wherein the control unit is configured to determine an actual position of the closure member and wherein the control unit is configured to apply a closed-loop control method using the determined actual position of the closure member.

7. The open roof assembly according to claim 1, wherein the control unit is configured to incur a predetermined stop of the motion of the closure member by short-circuiting the electric motor.

8. The open roof assembly according to claim 1, wherein the control unit is configured to detect an obstruction in a travel path of the closure member in motion and incurring the safety stop upon detection of such obstruction.

9. A method of operating an open roof assembly, the open roof assembly comprising a moveably arranged closure member for selectively covering or at least partially exposing an opening in a vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor, wherein the electric driving unit comprises four switching devices in a bridged configuration, the method comprising the control unit performing the steps of controlling a motion of the closure member by controlling operation of the switching devices, and incurring a safety stop during a motion of the closure member by an immediate reversal of a polarity of the supply signal.

10. The method according to claim 9, wherein reversal of the polarity is maintained for at least a first period of reversal, wherein the first period of reversal is selected based on an amount of play in the mechanical drive assembly such that in the first period of reversal the play in the mechanical drive assembly is absorbed at least partially by reversal of the electric motor and the motion of the closure member is stopped.

11. The according to claim 10, wherein reversal of the polarity is maintained for at least a first period of reversal, wherein the first period of reversal is selected based on an amount of play in the mechanical drive assembly such that in the first period of reversal the play in the mechanical drive assembly is absorbed at least partially by reversal of the electric motor and the motion of the closure member is stopped.

12. A computer software product comprising computer readable and executable instructions for instructing a computer processor to perform a method of operating an open roof assembly, the open roof assembly comprising a moveably arranged closure member for selectively covering or at least partially exposing an opening in a vehicle roof, an electric motor operatively coupled to the closure member through a mechanical drive assembly for moving the closure member, an electric driving unit for providing a supply signal to the electric motor and a control unit operatively coupled to the electric driving unit for controlling operation of the electric motor, wherein the electric driving unit comprises four switching devices in a bridged configuration, the instructions comprising the control unit performing the steps of:

controlling a motion of the closure member by controlling operation of the switching devices, and incurring a safety stop during a motion of the closure member by an immediate reversal of a polarity of the supply signal.

* * * * *